(12) United States Patent
Rueger et al.

(10) Patent No.: US 7,528,524 B2
(45) Date of Patent: May 5, 2009

(54) METHOD AND DEVICE FOR CONTROLLING A PIEZO ACTUATOR

(75) Inventors: Johannes-Joerg Rueger, Vienna (AT); Udo Schulz, Vaihingen/Enz (DE); Jens-Holger Barth, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 10/531,530

(22) PCT Filed: Sep. 29, 2003

(86) PCT No.: PCT/DE03/03230

§ 371 (c)(1), (2), (4) Date: Nov. 14, 2005

(87) PCT Pub. No.: WO2004/036016

PCT Pub. Date: Apr. 29, 2004

(65) Prior Publication Data

US 2006/0152879 A1     Jul. 13, 2006

(30) Foreign Application Priority Data

Oct. 15, 2002   (DE)   .................. 102 47 988

(51) Int. Cl.
*H01L 41/04* (2006.01)
*F02M 51/00* (2006.01)

(52) U.S. Cl. .................. 310/316.03; 123/490; 123/491
(58) Field of Classification Search ................. 310/316, 310/317, 316.03; 123/490, 491, 498
See application file for complete search history.

(56) References Cited

U.S. PATENT DOCUMENTS

| 6,016,231 A | 1/2000 | Kanbara et al. | |
| 2002/0008440 A1* | 1/2002 | Hedenetz et al. | ....... 310/316.03 |
| 2004/0130240 A1* | 7/2004 | Rueger | .................. 310/316.03 |

FOREIGN PATENT DOCUMENTS

| EP | 1 010 876 | 6/2000 |
| EP | 1 138 902 | 10/2001 |
| EP | 1 139 445 | 10/2001 |
| JP | 2002 34270 | 1/2002 |

\* cited by examiner

*Primary Examiner*—Jaydi SanMartin
(74) *Attorney, Agent, or Firm*—Kenyon & Kenyon LLP

(57) ABSTRACT

An apparatus and a method for controlling a piezoelectric actuator are described. The voltage applied to the piezoelectric actuator is detected at a specified time. If certain variables are present, the detection of the voltage and/or the relaying of a detected voltage value is blocked.

10 Claims, 2 Drawing Sheets

METHOD AND DEVICE FOR CONTROLLING A PIEZO ACTUATOR

FIELD OF THE INVENTION

The present invention relates to a method and an apparatus for controlling a piezoelectric actuator

BACKGROUND INFORMATION

A method and an apparatus for controlling a piezoelectric actuator are described in European Patent No. 11 38 902. In the procedure that is described there, the voltage that is applied to the piezoelectric actuator is detected and evaluated at specified times. The purpose of this evaluation is a possible closed-loop control of the voltage and/or a monitoring of the piezoelectric actuator.

Piezoelectric actuators are used in particular in piezoelectric injectors, which in turn are used for fuel metering in internal combustion engines. A piezoelectric injector of this type includes, among other things, a piezoceramic that is prestressed with a spring and that essentially behaves like a spring-mass system. If the piezoelectric actuator is charged or discharged with cyclically applied electrical current, the voltage curve upon charging and discharging is essentially step-shaped. Even if there is a constant electrical charge in the piezoelectric actuator, applying compression to the piezoelectric actuator results in a decrease in voltage, while applying tension to the piezoelectric actuator results in an increase in voltage. This causes a voltage overshoot and undershoot, respectively. In general, this means that the oscillation of the spring-mass system of the prestressed piezoelectric actuator causes an overshooting and undershooting of the voltage. This occurs in particular during and just after the end of the charging or discharging operation.

In addition, the fuel pressure acts upon the piezoelectric actuator also as a result of hydraulic effects. Through the injection that occurs at the end of the charging operation or through the termination of the injection, pressure waves are generated in the fuel, and these pressure waves act upon the piezoelectric actuator as a result of hydraulic effects, also causing the piezoelectric actuator to oscillate, thus causing voltage oscillations.

After the end of the charging or discharging operation, the voltage oscillations dissipate. Normally, therefore, the voltage is measured before discharging or before charging. The effect of the voltage oscillations on the measured voltage value becomes greater at short triggering durations as a result of the short time interval between the charging operation and the measuring time. The amplitude of the voltage oscillation also increases as rail pressure increases. The invention therefore provides that, when certain variables are present, the detection of the voltage values and/or their relay is blocked.

SUMMARY OF THE INVENTION

Because the detection or further transmission of the voltage values is prevented when certain variables are present, the precision of voltage detection and of the variables derived from it are improved significantly. In this way the precision with which the piezoelectric actuator is triggered, and therefore the injection, is improved markedly. As a result, the exhaust gas characteristics, noise, and the smoothness of the internal combustion engine are in turn significantly improved.

DETAILED DESCRIPTION

Figure 1:
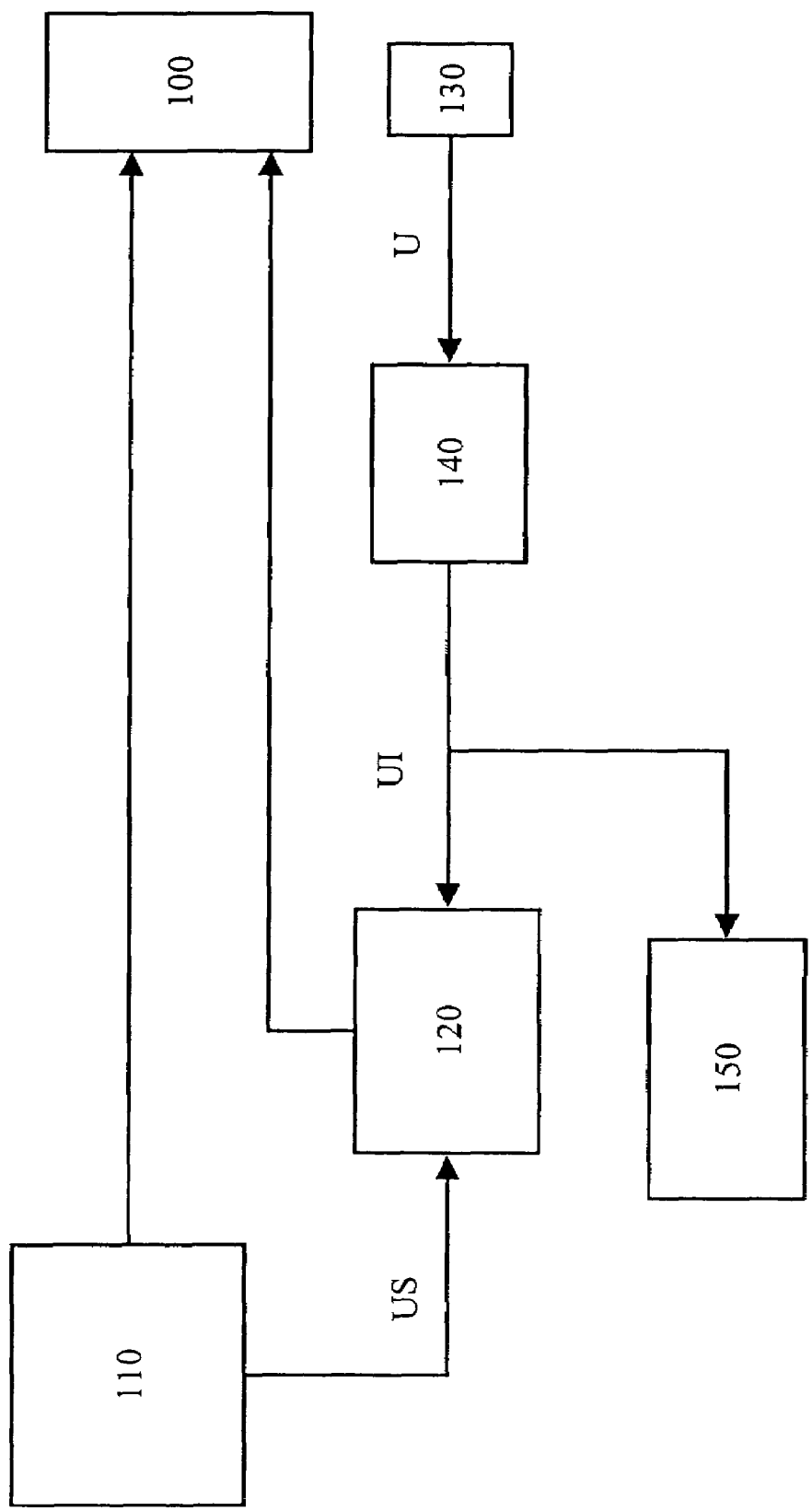
FIG. 1 shows a block diagram of the procedure of the invention.

FIG. 1 shows the main elements of the procedure according to the invention. An output stage, which is known, for example, from the related art, is marked as 100. This output stage receives signals from an open-loop controller 110 and a closed-loop controller 120. In addition, a voltage detection means 130 is provided in order to detect the voltage that decreases at the piezoelectric actuator. Voltage U is sent via a logic 140 to closed-loop controller 120 and to a monitoring means 150.

Open-loop controller 110 sends signals to output stage 100 that define the beginning and the end of fuel metering. These signals are calculated by open-loop controller 110 on the basis of sensor signals, not shown, and other variables that are not shown, for example the driver's torque request. Starting from the beginning and the end of the injection, output stage 100 calculates the time at which the piezoelectric actuator is charged or discharged.

The voltage that is applied to the piezoelectric actuator is regulated. In particular, this voltage regulation is provided in order to adjust for slow changes, in particular based on temperature effects, aging, and/or long-term drift. To that end, an actual value UI for the voltage is compared with a setpoint value US that is specified by open-loop controller 110, and then an appropriate manipulated variable is passed on to output stage 100. According to the invention, voltage detection means 130 detects this voltage and then, depending on a logic 140, sends it to closed-loop controller 120 or to monitoring means 150. By evaluating the voltage, monitoring means 150 detects errors that relate to triggering or that are present in the area of the piezoelectric actuator. This means that the voltage that is detected is used for monitoring and/or for generating a controlled variable.

According to the present invention, logic 140 recognizes whether severe oscillations are occurring that make it difficult to detect the voltage. In the embodiment shown in FIG. 1, logic 140 blocks the detected voltage value from being passed on for further evaluation. Also according to the invention, logic 140 may already block the detection of the voltage, so that no voltage measurement is performed in the selected operating states. According to the invention, the logic unblocks the measurement or the use of the measured voltage values, depending on the rail pressure and the interval between the time when the voltage is detected and the end of the charging operation and/or of the discharging operation.

Figure 2:
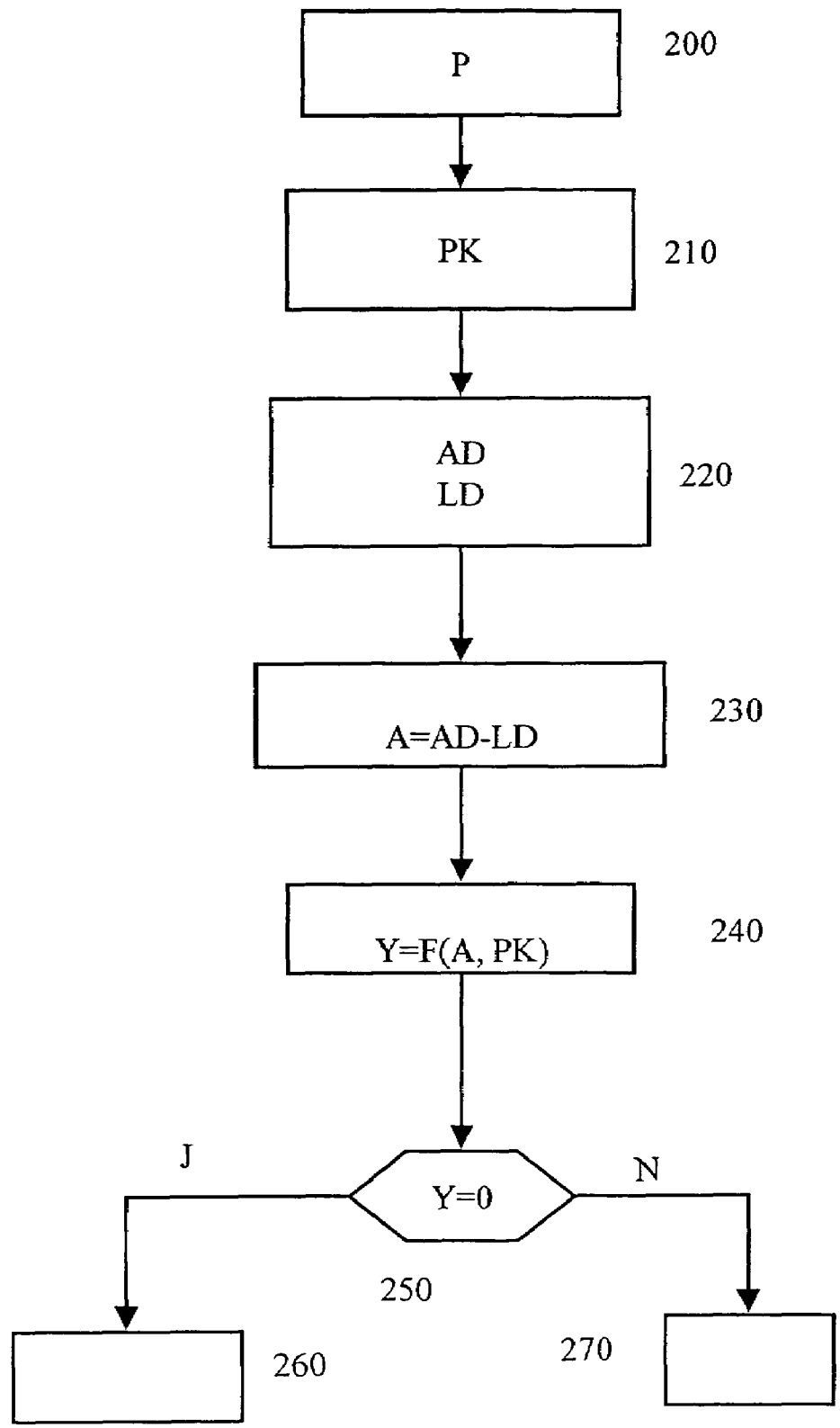
FIG. 2 shows a flowchart of the method of the invention.

The procedure according to the invention is shown in greater detail in FIG. 2. In a first step 200, rail pressure P is detected. In step 210 the detected pressure signal is corrected and a corrected rail pressure PK is determined. This correction takes into account in particular the pressure wave that passes through the fuel at the beginning of the injection and at the end of the injection. In a further step 220 the triggering duration AD and the charging time LD are determined. Triggering duration AD corresponds to the time between the beginning of the charging operation and the end of triggering. Charging time LD corresponds to the interval between the beginning of charging and the end of the charging operation.

Preferably, the charging time is recorded; in other words, the end of the charging operation is measured, and the difference relative to the beginning of charging, which is present in controller 110 and/or in output stage 100, is formed. Alternatively, an expected charging time, which is present in controller 110 and/or in output stage 100, may be used. Triggering duration AD is also present in controller 110 and/or in output stage 100.

In subsequent step 230, the interval between the scanning time for the voltage detection and the end of the charging operation, which is indicated by A, is determined by establishing the difference between triggering duration AD and charging duration LD.

In a following step 240 the rail pressure and time difference A are sent to a characteristics map and/or a table, in which a value Y is stored, which preferably assumes a value of 1 or a value of 0. The value 0 preferably indicates that the voltage measurement is blocked, and the value 1 indicates that the voltage measurement is unblocked. Subsequent scan 250 checks whether value Y has assumed a value of 0. If so, in step 260 the voltage measurement is blocked. If not, the voltage measurement is unblocked in step 270. If the voltage measurement is blocked, closed-loop controller 120 is replaced by an open-loop controller and/or the manipulated variable is frozen. This may be accomplished, for example, by storing the previous value UI in memory and continuing to use it. Alternatively, the output signal from closed-loop controller 120 may be stored and then used further.

In the present invention, blocking occurs dependent on the fuel pressure and/or dependent on a variable that characterizes the interval between the time the voltage is measured and the end of the charging operation and/or of the charging operation of the actuator. If blocking occurs, the last voltage value that was not blocked is used for closed-loop control and/or monitoring. In other words, the voltage value is frozen. Moreover, in the case of blocking, the last manipulated variable that was used prior to blocking may be used for open-loop control. In the event of closed-loop control, this means that the output signal from the closed-loop controller used to trigger the final control element is frozen.

As an alternative to the variables described above, other variables may be used. For example, the unblocking may be a function of the ratio between the triggering duration and the charging time. In other words, a quotient evaluation takes place.

Moreover, the invention may be embodied in such a way that only triggering duration AD of the actuator and/or the delivery duration of the injector. In other words, the interval between the end of the charging operation and the beginning of the discharging operation and/or the interval between the beginning of fuel metering and the end of fuel metering is/are evaluated. Thus, the voltage measurement may be blocked and/or the transmission of measurements may be prevented if triggering duration AD and/or the delivery duration is less than a threshold value. The threshold value is preferably a function of the rail pressure.

Alternatively, triggering duration AD, the delivery duration, and/or the ratio between the triggering duration and the charging time may be processed instead of variable A.

What is claimed is:

1. A method for controlling a piezoelectric actuator for injection of fuel supplied by a fuel supply rail, comprising:
   performing a voltage detection at a specified time of a voltage applied to the piezoelectric actuator in order to produce a detected voltage; and
   selectively blocking at least one of the voltage detection and a relaying of the detected voltage value, depending on a detected fuel pressure in the fuel supply rail.

2. The method as recited in claim 1, wherein the detected voltage value is used for at least one of monitoring and forming a controlled variable.

3. The method as recited in claim 1, wherein the blocking is further dependent on a variable that characterizes an interval between a time the voltage is measured and an of at least one of a charging operation and a discharging operation of the piezoelectric actuator.

4. The method as recited in claim 1, wherein the blocking is further dependent on a triggering duration of the piezoelectric actuator.

5. The method as recited in claim 1, wherein the blocking is further dependent on a charging time of the piezoelectric actuator.

6. The method as recited in claim 1, wherein the blocking is further dependent on a difference between a triggering duration and a charging time of the piezoelectric actuator.

7. The method as recited in claim 1, wherein the blocking is further dependent on a delivery duration of a final control element operated by the piezoelectric actuator.

8. The method as recited in claim 1, wherein in the event of blocking, the last non-blocked voltage value is used for at least one of a closed-loop control and monitoring.

9. The method as recited in claim 1, wherein in the event of blocking, the last manipulated variable used prior to blocking is used for open-loop control.

10. An apparatus for controlling a piezoelectric actuator for injection of fuel supplied by a fuel supply rail, comprising:
    a voltage detection unit configured to perform a voltage detection at a specified time of a voltage applied to the piezoelectric actuator in order to produce a detected voltage; and
    a control unit configured for selectively blocking at least one of the voltage detection and a relaying of the detected voltage value, depending on a detected fuel pressure in the fuel supply rail.

* * * * *